US008693737B1

(12) United States Patent
Newman et al.

(10) Patent No.: US 8,693,737 B1
(45) Date of Patent: Apr. 8, 2014

(54) AUTHENTICATION SYSTEMS, OPERATIONS, PROCESSING, AND INTERACTIONS

(75) Inventors: Kurt D. Newman, Matthews, NC (US); Debashish Ghosh, Charlotte, NC (US); David Joa, Pacifica, CA (US); Timothy J. Bendel, Charlotte, NC (US); Michael James O'Hagan, Charlotte, NC (US); Mayur Chheda, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 641 days.

(21) Appl. No.: 12/242,806

(22) Filed: Sep. 30, 2008

Related U.S. Application Data

(60) Provisional application No. 61/026,387, filed on Feb. 5, 2008, provisional application No. 61/057,829, filed on May 31, 2008.

(51) Int. Cl.
*G06K 9/00* (2006.01)
*H04N 7/18* (2006.01)

(52) U.S. Cl.
USPC .......................................... 382/117; 348/143

(58) Field of Classification Search
USPC ................................ 382/115, 117; 348/143
See application file for complete search history.

(56) References Cited

U.S. PATENT DOCUMENTS

| 4,658,290 A | 4/1987 | McKenna et al. |
| 5,097,328 A | 3/1992 | Boyette |
| 5,331,544 A | 7/1994 | Lu et al. |
| 5,455,407 A | 10/1995 | Rosen |
| 5,793,290 A * | 8/1998 | Eagleson et al. ........... 340/573.4 |
| 5,850,470 A | 12/1998 | Kung et al. |
| 5,875,437 A | 2/1999 | Atkins |
| 6,282,522 B1 | 8/2001 | Davis et al. |
| 6,655,587 B2 | 12/2003 | Andrews et al. |
| 6,912,398 B1 | 6/2005 | Domnitz |
| 7,155,411 B1 | 12/2006 | Blinn et al. |
| 7,318,049 B2 | 1/2008 | Iannacci |
| 7,391,887 B2 | 6/2008 | Durnell |
| 7,533,058 B2 | 5/2009 | Kulakowski |
| 7,555,728 B2 | 6/2009 | Esaki et al. |
| 7,565,329 B2 | 7/2009 | Lapsley et al. |
| 7,571,140 B2 | 8/2009 | Weichert et al. |
| 7,593,892 B2 | 9/2009 | Balk et al. |
| 7,606,401 B2 | 10/2009 | Hoffman et al. |
| 7,613,659 B1 | 11/2009 | Hoffman et al. |
| 7,620,605 B2 | 11/2009 | Hoffman et al. |
| 7,631,803 B2 | 12/2009 | Peyret et al. |
| 7,689,504 B2 | 3/2010 | Warren et al. |

(Continued)

*Primary Examiner* — Amir Alavi
*Assistant Examiner* — Kenny Cese
(74) *Attorney, Agent, or Firm* — Banner & Witcoff, Ltd.; Michael A. Springs

(57) ABSTRACT

Systems and methods for biometrically identifying an individual for purchasing a product and/or service without a need for the individual to input authentication data into a system/device are described. Data representative of a scanned iris of a customer desiring to make a purchase may be made. The customer may be identified based upon the scanned iris. A determination may be made as to whether the identified customer has a plurality of accounts at a financial entity. Information of a selected account to make the purchase may be received. Sufficient funds in the selected account to make the purchase may be determined. If insufficient, a different account may be identified to make the purchase. Sufficient funds in the different accounts may be determined and funds in the different accounts may be decreased by the associated payment amount.

10 Claims, 7 Drawing Sheets

(56) References Cited

U.S. PATENT DOCUMENTS

| | | |
|---|---|---|
| 7,734,545 B1 | 6/2010 | Fogliano et al. |
| 7,766,244 B1 | 8/2010 | Field et al. |
| 7,778,920 B2 | 8/2010 | Zarin et al. |
| 7,783,566 B2 | 8/2010 | Armes et al. |
| 7,814,009 B1 | 10/2010 | Frenkel |
| 7,860,789 B2 | 12/2010 | Hirka et al. |
| 7,870,071 B2 | 1/2011 | Gupta |
| 7,890,421 B2 | 2/2011 | Dumas-Brown et al. |
| 7,912,777 B2 | 3/2011 | Freud et al. |
| 7,945,238 B2 | 5/2011 | Baker et al. |
| 7,945,512 B2 | 5/2011 | Scipioni et al. |
| 7,970,678 B2 | 6/2011 | Lapsley et al. |
| 8,396,747 B2 | 3/2013 | Bachenheimer |
| 2001/0000535 A1 | 4/2001 | Lapsley et al. |
| 2001/0029496 A1 | 10/2001 | Otto et al. |
| 2001/0042002 A1 | 11/2001 | Koopersmith |
| 2001/0051931 A1 | 12/2001 | Schweitzer |
| 2002/0019811 A1 | 2/2002 | Lapsley et al. |
| 2002/0022966 A1 | 2/2002 | Horgan |
| 2002/0062249 A1 | 5/2002 | Iannacci |
| 2002/0111917 A1 | 8/2002 | Hoffman et al. |
| 2002/0120582 A1 | 8/2002 | Elston et al. |
| 2002/0138309 A1 | 9/2002 | Thomas, Jr. |
| 2002/0152179 A1 | 10/2002 | Racov |
| 2002/0169675 A1 | 11/2002 | Helot et al. |
| 2003/0026404 A1 | 2/2003 | Joyce et al. |
| 2003/0050732 A1 | 3/2003 | Rivalto |
| 2003/0069802 A1 | 4/2003 | Ramsey-Catan |
| 2003/0078901 A1 | 4/2003 | Coppola, Jr. et al. |
| 2003/0085272 A1 | 5/2003 | Andrews et al. |
| 2003/0085929 A1 | 5/2003 | Huber et al. |
| 2003/0088536 A1 | 5/2003 | Behnia |
| 2003/0126079 A1 | 7/2003 | Roberson et al. |
| 2003/0217024 A1 | 11/2003 | Kocher |
| 2004/0016801 A1 | 1/2004 | Newsome et al. |
| 2004/0044564 A1 | 3/2004 | Dietz et al. |
| 2004/0059684 A1 | 3/2004 | Jang |
| 2004/0093271 A1 | 5/2004 | Walker et al. |
| 2004/0093281 A1 | 5/2004 | Silverstein et al. |
| 2004/0143545 A1 | 7/2004 | Kulakowski |
| 2004/0236632 A1 | 11/2004 | Maritzen et al. |
| 2005/0035200 A1* | 2/2005 | Hendrick .................... 235/441 |
| 2005/0060257 A1 | 3/2005 | Fry |
| 2005/0077349 A1 | 4/2005 | Bonalle et al. |
| 2005/0080692 A1 | 4/2005 | Padam et al. |
| 2005/0125744 A1 | 6/2005 | Hubbard et al. |
| 2005/0144133 A1 | 6/2005 | Hoffman et al. |
| 2005/0175218 A1 | 8/2005 | Vertegaal et al. |
| 2005/0177427 A1 | 8/2005 | Mount et al. |
| 2005/0187843 A1 | 8/2005 | Lapsley et al. |
| 2005/0203844 A1 | 9/2005 | Ferguson et al. |
| 2005/0289057 A1 | 12/2005 | Onizuka |
| 2006/0059557 A1* | 3/2006 | Markham et al. ............... 726/22 |
| 2006/0089894 A1 | 4/2006 | Balk et al. |
| 2006/0093190 A1* | 5/2006 | Cheng et al. .................. 382/115 |
| 2006/0190330 A1 | 8/2006 | Tollinger et al. |
| 2006/0195394 A1 | 8/2006 | Jung et al. |
| 2006/0206395 A1 | 9/2006 | Vallabh |
| 2006/0212407 A1 | 9/2006 | Lyon |
| 2006/0219780 A1 | 10/2006 | Swartz et al. |
| 2006/0220787 A1* | 10/2006 | Turner et al. ................. 340/5.61 |
| 2006/0253710 A1 | 11/2006 | Koo |
| 2006/0259390 A1 | 11/2006 | Rosenberger |
| 2006/0259777 A1* | 11/2006 | Izawa .......................... 713/186 |
| 2006/0293960 A1 | 12/2006 | Iannacci |
| 2007/0001835 A1* | 1/2007 | Ward et al. .................... 340/522 |
| 2007/0075134 A1 | 4/2007 | Perlow et al. |
| 2007/0083460 A1 | 4/2007 | Bachenheimer |
| 2007/0106558 A1 | 5/2007 | Mitchell et al. |
| 2007/0168265 A1 | 7/2007 | Rosenberger |
| 2007/0189585 A1* | 8/2007 | Sukegawa et al. ............ 382/118 |
| 2007/0255658 A1 | 11/2007 | Grad |
| 2007/0260883 A1 | 11/2007 | Giobbi et al. |
| 2008/0014908 A1 | 1/2008 | Vasant |
| 2008/0015985 A1 | 1/2008 | Abhari et al. |
| 2008/0021813 A1 | 1/2008 | Simpson et al. |
| 2008/0025572 A1 | 1/2008 | Schneider et al. |
| 2008/0046366 A1 | 2/2008 | Bemmel et al. |
| 2008/0097783 A1 | 4/2008 | Iannacci |
| 2008/0103968 A1 | 5/2008 | Bies et al. |
| 2008/0109320 A1 | 5/2008 | Kleinhans |
| 2008/0201769 A1 | 8/2008 | Finn |
| 2008/0218338 A1* | 9/2008 | Schoettle ...................... 340/541 |
| 2008/0228643 A1 | 9/2008 | Hall |
| 2008/0243614 A1 | 10/2008 | Tu et al. |
| 2008/0249869 A1* | 10/2008 | Angell et al. .................... 705/14 |
| 2008/0282334 A1 | 11/2008 | Yves et al. |
| 2009/0070207 A1 | 3/2009 | Engel et al. |
| 2009/0094130 A1 | 4/2009 | Dattathreya et al. |
| 2009/0150286 A1 | 6/2009 | Barton |
| 2009/0167492 A1* | 7/2009 | Madafferi et al. ........... 340/5.82 |
| 2009/0204546 A1 | 8/2009 | Haidar |
| 2009/0259560 A1 | 10/2009 | Bachenheimer |
| 2011/0264558 A1 | 10/2011 | Alexandrou |
| 2012/0221470 A1 | 8/2012 | Lyon |

\* cited by examiner

AUTHENTICATION SYSTEMS, OPERATIONS, PROCESSING, AND INTERACTIONS

RELATED APPLICATIONS

This application claims priority from U.S. Provisional Patent Application Ser. No. 61/026,387, filed Feb. 5, 2008, entitled, "Payment Acquisition, Routing, and Processing," and U.S. Provisional Patent Application Ser. No. 61/057,829, filed May 31, 2008, entitled, "Authentication Systems, Operations, Processing, and Interactions." The contents of the aforementioned provisional applications are hereby incorporated by reference in their entirety.

BACKGROUND

Convenience in transactional purchases, whether for products or services, is a useful tool in attracting and maintaining customers for an entity providing products and/or services. With respect to purchases, credit cards and stored value cards have become widely used. Under such systems, a user presents a card or a device with account information. Then upon payment authorization, goods and/or services are purchased. Such systems carry operational situations that may be harmful to both a customer and an entity providing a service and/or product.

Fraud has been increasing steadily under such systems. The actual fraud loss amount in addition to fraud detection capability development to reduce fraud losses are large business expenses. In addition, unauthorized use of credit or debit cards or information associated with such cards has led to an increase in unauthorized identity use. Correction of fraudulent transaction by unauthorized identity use is costly both for a consumer and for entities associated with the fraudulent purchases by the unauthorized individual.

In addition, under such systems, a purchaser has to carry a card or a device to the Point of Sale (POS) to initiate a transaction. If a purchaser wants to purchase a product at a store and forgets her purse with the card or device in it, she cannot complete the transaction. Although new payment technology developments, including touch-less transactions supported by radio frequency identification (RFID) chips in devices such as cell phones, are supported through current networks, a user must still have the RFID chip on her.

FIG. 3 illustrates a card payment system. At 301, a payer presents a card or a device with account information to a merchant. The merchant sends the transaction information on the card or device to a transaction acquiring bank in step 303. Such a situation may occur when a merchant swipes the credit card of the payer in a card reading machine and the data on the card is transferred to the transaction acquiring bank. In 305, the transaction acquiring bank sends a message to the card issuing bank through card networks to request a transaction authorization.

In 307, the card issuing bank issues an authorization to the transaction acquiring bank. Upon receipt of the authorization at the POS in 309, the payer provides a signature or inputs a Personal Identification Number (PIN) to conduct the transaction as an authentication of the payer. The transaction acquiring bank presents the actual charge to the card issuing bank in 311. In 313, the card issuing bank sends the payment to the transaction acquiring bank. In 315, the payer eventually pays the issuing card bank for the transaction and/or acquires debt to the issuing card bank and the merchant eventually receives payment from the transaction acquiring bank. Interchange and processing fees are withheld from the payment prior to crediting the merchants account. The interchange fees cover costs for the transaction including transaction processing and other costs. Such a system demonstrates the need for a card or device for authentication of the payer.

Still further, funding accounts for payments are primarily limited to demand deposit accounts (DDA) (debit card transactions) and unsecured line of credit (credit card transactions). Each funding account requires a different card or account number for use and/or operation. Therefore, if a payer desires to charge different transaction types to different accounts, she has to maintain different payment cards or devices. Such a situation requires a payer to maintain a number of different cards or devices on her person.

Still further, identification of an individual still may not prevent fraud or other illegal activities from occurring. For example, a vault system that includes some type of identification before allowing entry into the vault may be harmed by a number of problems. First, an individual may be forced to open a vault system and an unauthorized user merely follows the person in. Second, in another scenario, a user may legally gain access to the vault and then have to prop the door of the vault open for exiting the vault. Such a scenario allows an unauthorized individual to slip into the vault and take something while the legal individual is occupied carrying items out of the vault. Third, a user may be authorized to enter into the vault but remove nothing or only certain items of known weight. However, without systems of prevention in place, a user may be authorized to enter and then take more than allowed to take with them.

In addition, security of a building can be affected by unauthorized individuals being in unauthorized areas. Locks on doors prevent individuals without keys from entering, but once in, a person can enter areas that she is not authorized to enter. Such a scenario allows a person that has gotten in or successfully bypassed a security measure to move freely about a facility or building. Should she even later be detected, she can exit out of a certain point without restriction.

General retail transactions can force individuals to have to wait for long periods of time. If too long, an individual may choose to take her business elsewhere at that time or even in the future. Still further, even if the individual decides to wait in line the entire time, more time is lost in servicing the individual for her specific need. As such, a customer waits in line and then has to explain the needed service or product when interacting with a person or machine.

Still further, identification of patients in a hospital ensures minimal mistakes with respect to incorrect treatment or medication, in addition to proper location of the patient. A patient suffering from Alzheimer's disease may find herself walking outside of a treatment home or hospital or into areas that she should not be. If a loved one comes to visit, an orderly or other individual may have to take considerable time to locate the patient.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present disclosure are directed to a method and system for a new payment routing system to create a direct linkage between a Point of Sale (POS) and a financial entity to reduce cost and enable creation of proprietary touch-less and token-less transactions.

For payments where a funding account is associated with a particular entity account, aspects of the present disclosure recognize and use various transaction acquisition protocols, some of which may be proprietary (traditional card, touch-less using radio frequency identification [RFID], and token-less transactions acquired through biometric identification). Additionally, various account types, and sub-accounts thereof, may be used to fund the payments.

For payments where the funding account is not associated with a particular entity account, in accordance with aspects herein, the financial entity may act as a transaction acquiring bank and process a transaction as a traditional card transaction using existing networks and protocols. When funds for the payment are received by the financial entity, they may be transferred to a financial institution and an account designated by the merchant.

Another aspect of the present disclosure is directed to methods and systems for biometrically identifying an individual for purchasing a product and/or service without a need for the individual to input authentication data into a system/device.

Aspects of the present disclosure are directed to authentication systems, operations, processing, and interactions. Aspects describe authentication systems for security and vaults that are configured to authorize only specific individuals entry into a vault or area. Aspects describe systems to prevent maintaining a doorway open into the area or vault in addition to unauthorized entry or exit of people or things into or out of such areas or vaults.

Other aspects of the present disclosure are directed to building security authentication and tracking systems to allow authorized individuals into certain buildings or areas and preventing unauthorized individuals from entering and/or accessing certain buildings or areas. Aspects describe tracking of individuals throughout a building or facility to ensure authorized access in addition to identification of individuals in the event of an emergency and/or disaster situation.

Another aspect of the present disclosure is directed to methods and systems for customer authentication and identification during transactional situations. Aspects describe systems and methods for identifying a customer upon entry into an establishment and one or more various responses in return. In accordance with one embodiment, upon identification and authentication of a customer, an individual of a store or business may be notified to an arrival. If a meeting is already scheduled, that individual can immediately interact with the customer. Alternatively, if the meeting is not scheduled, but the individual is identified as an important customer or one that should be addressed immediately, an individual may be notified to address the needs of that customer. With identification and authentication, the individual of the business to interact with the customer may be notified of the customer's name and/or other information in order to address the person by specific name as opposed to a simple greeting of "how may I help you?."

In accordance with still other aspects, customer's interests within the store may be tracked in order to provide additional information. Such information may be provided by means of a display and/or individual. In addition, a cellular telephone or other device of that customer may be contacted in order to provide such information. Further aspects allow for identification of known past fraudulent offenders or other individuals wanted by the police. Immediate action may be taken to remove other customers from the premises and/or subdue the individual.

Other aspects allow for identification and authentication of individuals at a drive up window of a business. For a bank entity, the processing of identification and authentication on one or more accounts can be handled as the individual drives up to the business and not after the individual gets to the window. For a prescription pick-up window, once identified and authenticated, the prescription can be picked up directly without waiting in a line. Still other aspects allow for action in response to authentication of armed car guards, night deposit workers, cash recycling individuals, and other individuals.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

Figure 1:
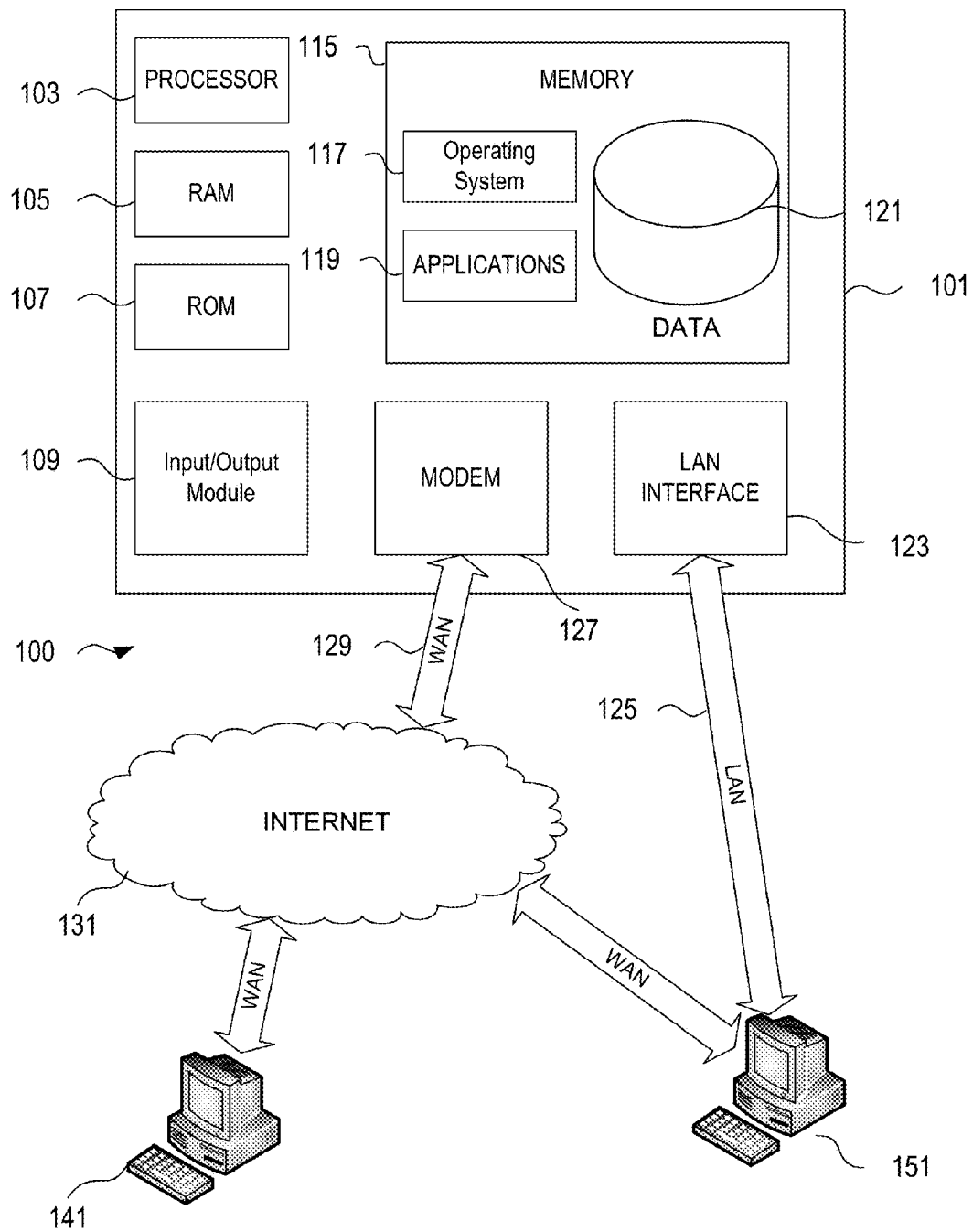
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the disclosure may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
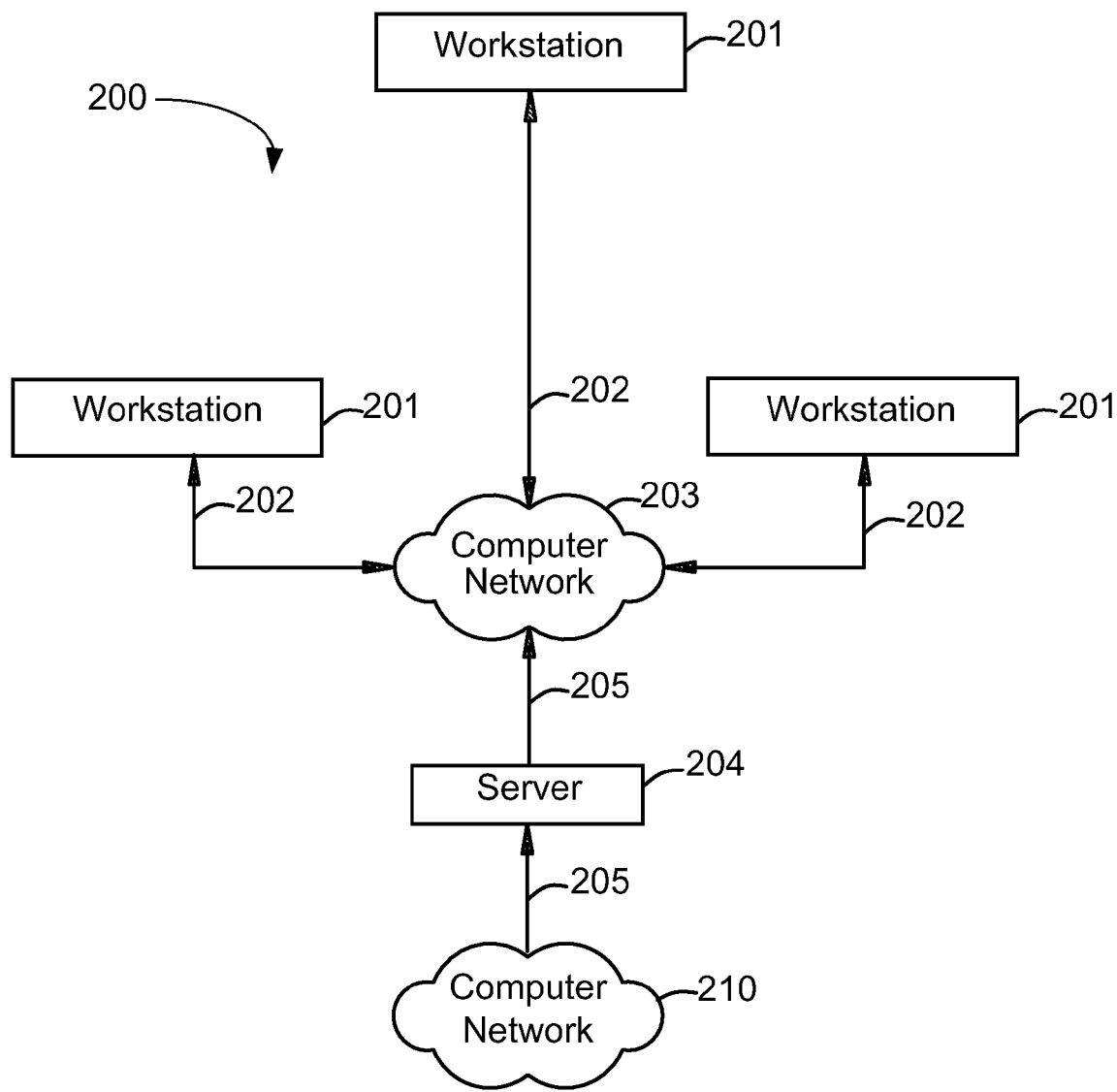
FIG. 2 is an illustrative block diagram of workstations and servers that may be used to implement the processes and functions of certain embodiments of the present disclosure.
Figure 3:
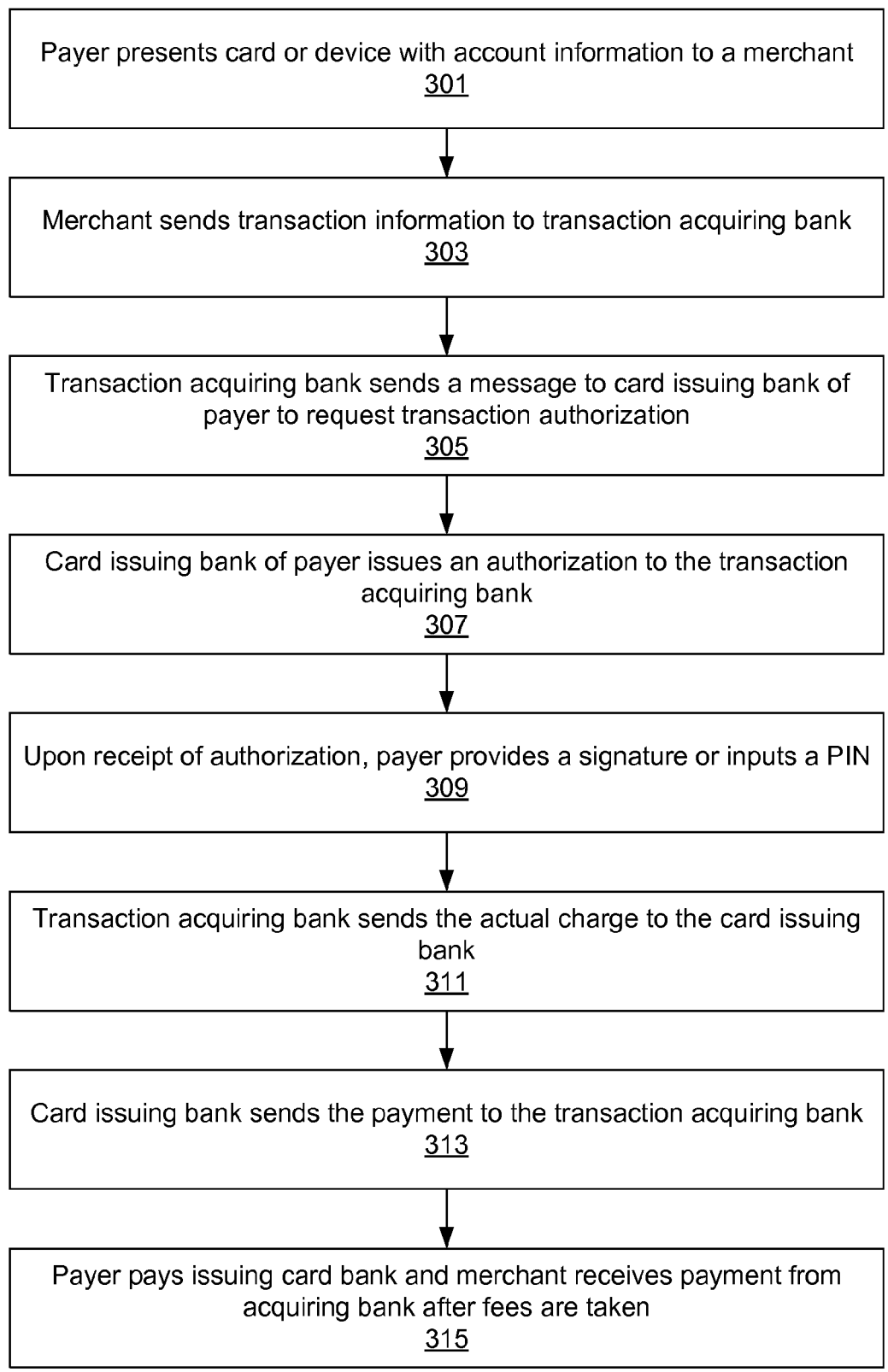
FIG. 3 is an example card payment system.

Referring to FIG. 2, an illustrative system 200 for implementing methods according to the present disclosure is shown. As illustrated, system 200 may include one or more workstations 201. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

The steps that follow in the Figures may be implemented by one or more of the components in FIGS. 1 and 2 and/or other components, including other computing devices.

Figure 4:
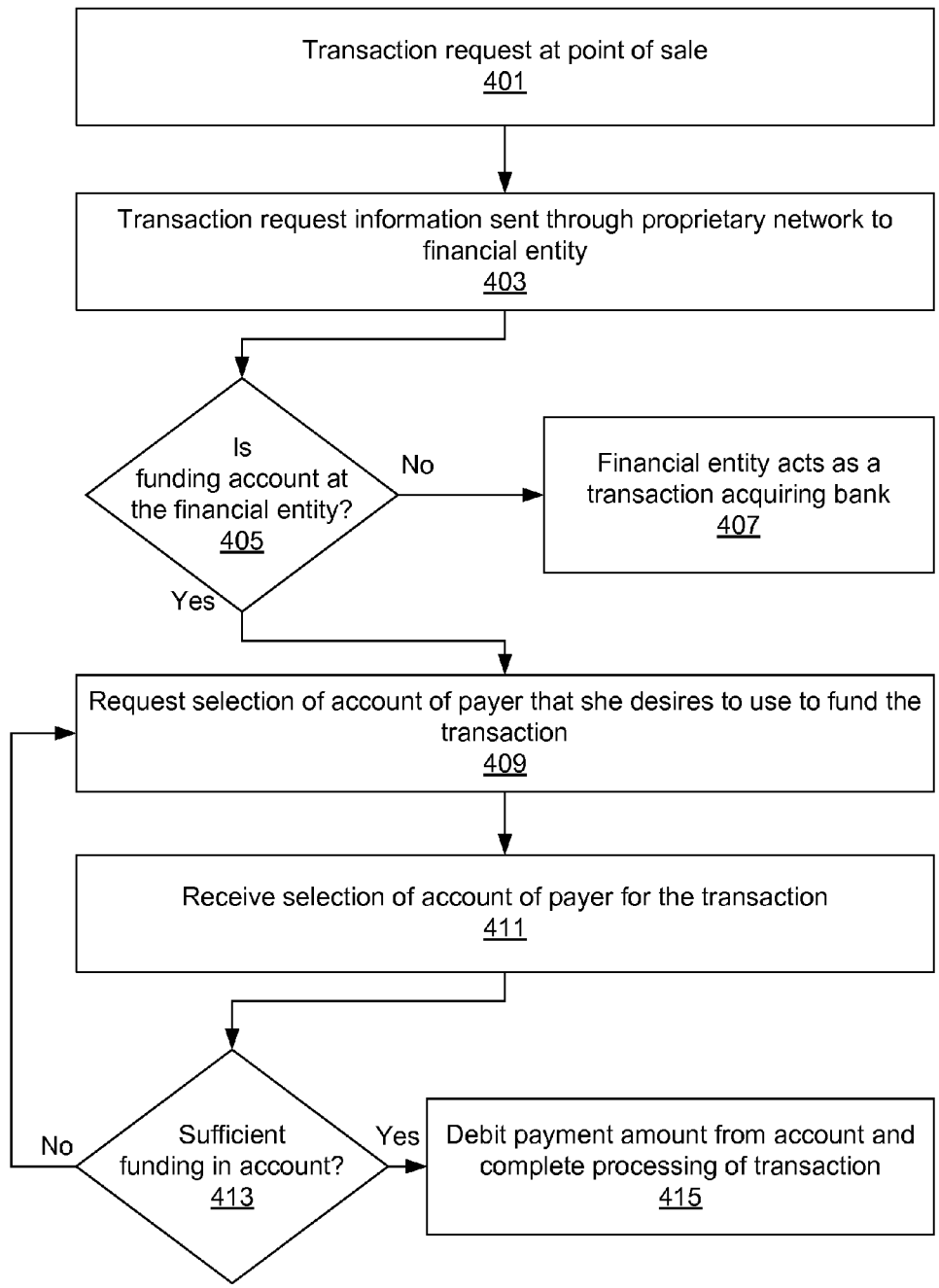
FIG. 4 is a flowchart of an illustrative method for transaction routing and processing in accordance with at least one aspect of the present disclosure.

FIG. 4 is a flowchart of an illustrative method for transaction routing and processing in accordance with at least one aspect of the present disclosure. In step 401, a transaction request occurs at a point of sale (POS). Such a situation may occur when an individual enters a grocery store and is at a check line for purchasing the groceries, or a car service shop payment booth, or a vending machine with products for purchase. The transaction request may be a traditional card or device, such as a credit or debit card, a touch-less based request, such as utilizing radio frequency identification (RFID), and/or biometric identification as described herein. Proceeding to step 403, transaction information associated with the individual and the transaction are sent through a network that may be proprietary, to a financial entity associated with the network.

A funding account associated with the transaction data of the individual is determined and, in step 405, a determination is made as to if the funding account exists at the financial entity associated with the network. An example may be a situation where the individual has accounts with a first bank and is utilizing a debit card of the first bank in the transaction while the financial entity associated with the network in the determination at step 405 is a second, different financial entity. If the funding account is not at the financial entity, the process moves to step 407 where the financial entity acts as a transaction acquiring bank. In such a situation, the financial entity may communicate with the card issuing bank of the individual to obtain transaction authorization and may send the authorization to the POS. When the individual provides a signature or inputs a PIN to conduct the transaction, the financial entity forwards the transaction to the issuing bank. When the financial entity receives funds for the transaction, less interchange fees, the funds may be transferred to an account at the financial institution designated by the merchant.

Returning to step 405, if the funding account of the individual is at the financial entity, the method moves to step 409. In step 409, a request may be sent to the individual to select an account to be used to fund the specific transaction that is occurring. Such a situation may occur when the user is at a checkout line at a grocery store. The individual has already swiped her card on a machine that has read the transaction data on the card. Now, the machine may prompt the user to enter a number that corresponds to the desired account to use. The transaction information, having been processed by some internal and/or external computing system, may lead to identification of multiple accounts of the individual and/or sub-accounts with an account of the individual.

For example, having identified the particular individual from the transaction data, the individual may have several different funding accounts with the financial entity, and may now be able to choose the particular account for debit of the funds for payment on the transaction. As such, in such an example, the user may see four different options on a display associated with the machine. The display may prompt the user to choose a funding account from one or more of stored value accounts, such as non-interest accounts, demand deposit accounts, such as interest accounts including checking and savings, secured line of credit accounts, such as home equity and pledged asset, and/or unsecured line of credit, such as a traditional credit card.

Returning to step 411, the system may receive a selected entry of an account of the payer for the transaction. For example, the individual, payer, may push a button corresponding to using a checking account of the individual for debit of the funds needed for the transaction. At step 413, a determination is made as to whether there is sufficient funding identified in the account selected by the individual. If the required funding is not present in the selected account, the process may return to step 409 where the individual is prompted to select a different account of the individual for funding the transaction. In such a situation, the prompt may be shown not to include an option of the previously selected account that did not have sufficient funds to complete the transaction. Returning to step 413, if there is sufficient funds in the account selected by the individual, the system debits the payment amount from the selected account and completes the processing of the transaction in step 415. Such processing may include withholding transaction processing costs, transferring funds to an account at a financial institution designated by the merchant, and sends a processing complete message to the POS.

As should be understood, any of a number of different types of accounts may be designated under such an account selection system. For example, a user with a checking account may have a plurality of sub-accounts associated with the master account. One or more sub-accounts may allow for withdrawal of funds for a particular entity, such as grocery stores, coffee shops, sports clothing stores, etc. One or more sub-accounts may allow for withdrawal of funds for a genre of entity, such as an entertainment sub-account that allows for withdrawal to movie theaters, amusements parks, video rental stores, and bars. In accordance with one or more aspects of the present disclosure, the selection of accounts by the user may occur prior to the POS.

For example, an individual may access a website to enter specific funding accounts for specific uses. A user may designate that all grocery expenses should be funded through a checking account of the user, while all gas purchases should be funded through a savings account of the user. Thus, when making a transaction, the user may use a single card to debit funds from different accounts for different entities. In addition, utilizing biometric identification described herein, the user need not even have a card or other identifying device. In still other examples, a user may designate a temporal feature associated with one or more accounts. For example, a user may designate that groceries should be debited from a checking account for a predetermined period during a calendar month and then from a different account, such as an unsecured line of credit, a credit card, for another period in the calendar month. Such a situation may arise for paydays of the user. On paydays and for a week thereafter, a user may want funds to come out of the checking account directly, while, for other periods of time the user may want to have funds debited to a credit card. As should be understood, any of a number of different periods of time, genres of entities, and/or other parameters may be implemented with one or more accounts and sub-accounts in accordance with one or more aspects of the present disclosure.

Figure 5:
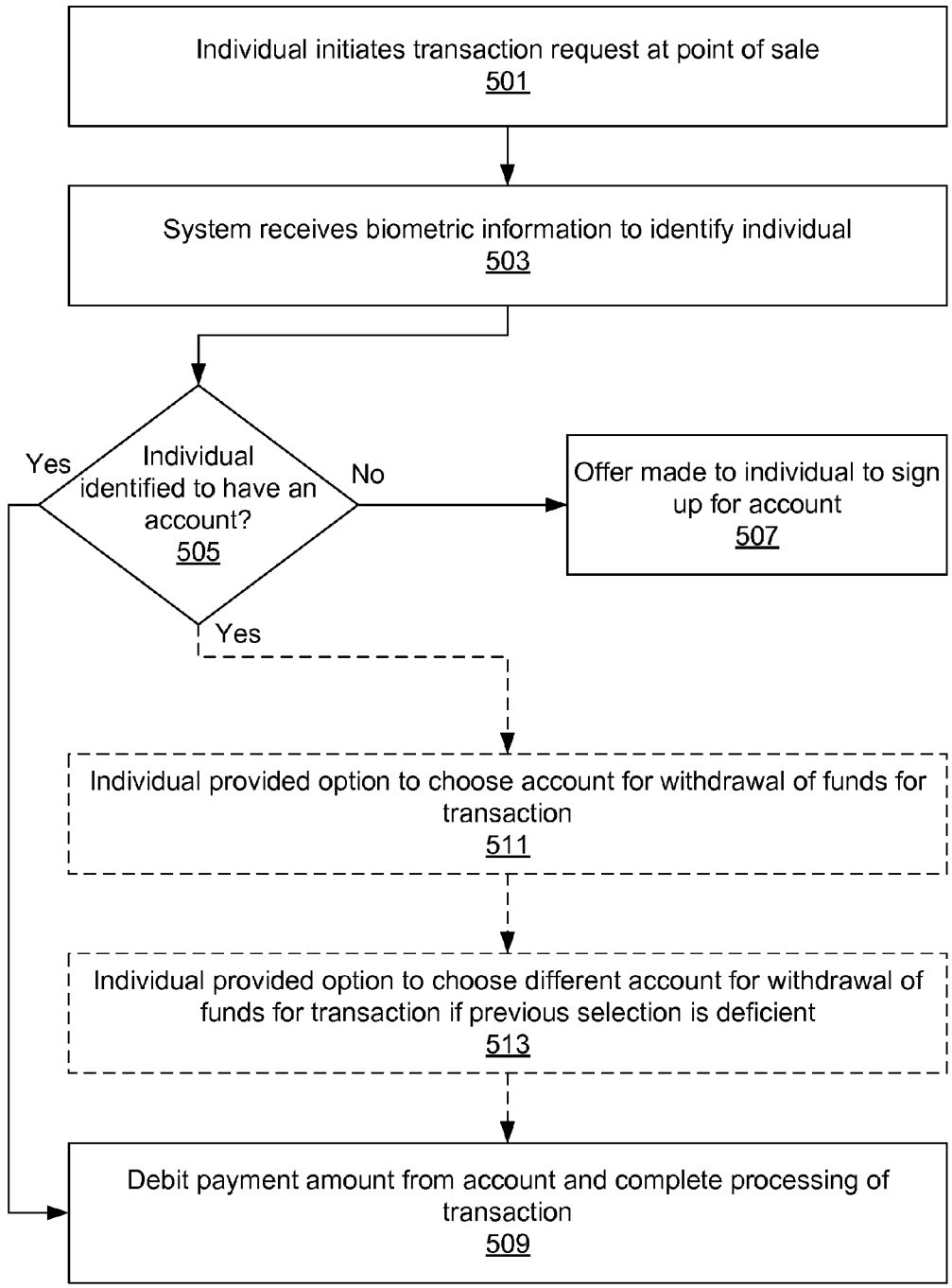
FIG. 5 is a flowchart of an illustrative method for identifying an individual for transaction processing in accordance with at least one aspect of the present disclosure.

FIG. 5 is a flowchart of an illustrative method for identifying an individual for transaction processing in accordance with at least one aspect of the present disclosure. The process begins and at step 501, an individual initiates a transaction request at a point of sale. At step 503, the system receives biometric information to identify the user. In accordance with at least one aspect of the present disclosure, the individual may look into the field of view of a scanning device configured to scan the iris of a person. In such a situation, the individual need not supply a name, an account number, or any other type of identification to complete a transaction. The identification of the individual in step 503 may be based upon previous biometric and other information gathered about the individual. The individual may have allowed for an initial scan of her iris to associate herself with an account. The account may then be associated with a funding account for payment purposes.

Returning to FIG. 5, at step 505, a determination is made as to whether the individual is identified to have an account. Step 505 may be an identification of the individual and her account, an identification of the individual, but she does not have an account, or no identification of the individual. In one example, the system may not be able to identify the individual if she has never registered for an account before. In another example, the system may be able to identify an individual from previous transactions, but may note no active account if the individual has previously closed the account. In another example, with an active account, the system may identify the individual from previous transaction and/or registration.

If there is no active account in step 505, the process moves to step 507 where the system may direct the individual to an offer to sign up, e.g., register, for an account for future use. In such a situation, the individual may need to provide information up front to associate a funding account she has with the account of the system. If the individual and associated account is identified in step 505, the process may move to step 509 where the system may debit the payment amount from the account of the individual and complete the processing of the transaction as necessary. With an active account in operation under the system, an individual may make transactions without providing more than a single biometric identifier.

In accordance with one or more aspects of the present disclosure, optional method portions may be included as shown in FIG. 5 in broken line form. From identification of the individual and account with the system in step 505, the process may proceed to step 511 where the system may provide an option to the individual to choose an account for withdrawal of funds to complete the transaction. Such may be similar to step 409 in FIG. 4. In response to step 511, the individual may select an account, such as a debit account, for payment of the funds. In another illustrative example, the option for an individual to choose an account for withdrawal of funds to complete a transaction may occur prior to a point of sale as described herein.

The process may proceed to step 513 if the system determines that the selected account includes insufficient funds to complete the transaction. Such may be similar to step 413 in FIG. 4. In step 513, the individual may be prompted to select another account to withdraw funds from for the transaction payment. From step 513, the process may proceed to step 509 to complete the transaction.

An illustrative example in accordance with one or more aspects of the present disclosure are described herein. A city may have a mass transit system for transporting patrons via multiple modes of transport, including bus, underground subway, and above ground trains. A user may want to use one or more of these public services for work and/or pleasure purposes. For example, the user may travel to and from work via one or more of these public transportation services. Initially, the user may register for an account with the public services system of the city. The user may be able to register via a website registration service, an in-person registration service, a mail-in registration service, and/or some other registration service. The registration may have a user provide certain financial information, such as one or more accounts to withdraw funds from for use of the public transportation services on a per use basis. As such, the user may provide account information about herself and her financial entity. In addition, the user may be requested to provide a biometric identification. Such may be a scan of her iris. Any of a number of technologies may be utilized to scan an individual's iris for identification and/or other biometric systems may be utilized. With an active account, a user may utilize the public transportation services.

The user may initially walk to an underground subway entrance as the first part of her trip to work. Upon entering, the user may be prompted to look into a camera for recordation of a biometric parameter of the user. Such may be a case where a camera is configured to measure her iris. The user may look into the field of view of the camera and the camera may capture the iris of the individual. With the scanned iris information, the system may search and find the associated account of the user. The system may immediately debit the account of the user and allow her to proceed to the underground train. In such a situation, the user need not carry a card or device associated with an account to use the service. If the user has forgotten her purse at home, she need not return home to get her card for use of the underground train. The biometric information that she carries on her at all times may be utilized.

Upon exit from the underground train, a second scan may be performed. Such a situation may be a case where the public transportation system has different fares for different distances, times, locations, events, etc. If the public transportation system charges a single fare for use, a second scan during exit may not be needed. Similarly, upon exit the user may now need to take a bus to get closer to work instead of walking. A similar scanning camera may be located at the entrance of the bus. Upon identifying the user, an account may be debited for the tip on the bus. In addition, a second scan may occur when departing from the bus if different fares for use, time, event, etc. are in place by the mass transit system.

As such, a user is provided an opportunity to utilize public transportation services without the need to carry money, a token, an account card, or some other form of identification except for biometric information that the user always has on her person. As should be known, although the examples described herein relate to identification by iris scanning, other biometric parameters may be scanned and/or identified for use in accordance with one or more aspects of the present disclosure. For example, a finger print analysis may be performed.

In accordance with another aspect of the present disclosure, anonymous accounts may be coordinated through a product or service provider for its customers and a financial entity. Some consumer payment scenarios, such as most public transportation systems, have the equivalent of "anonymous accounts" because consumers can deposit funds for later use without having to identify themselves. For public transportation systems, passengers can insert cash into a machine and receive tokens used for passenger fares. Passengers do not have to identify themselves before they purchase tokens. A financial entity does not currently have the ability to implement "anonymous accounts" because of government regulations requiring knowledge of the identity of the customer associated with the account. As understood by those skilled in the art, the following illustrative examples are with respect to a public transportation infrastructure; however, one or more aspects of an anonymous account described herein may be implemented and/or utilized by any of a number of service and/or product providers.

Using the example of a public transportation system, there are two high level processes. First, there is a process identified as payment. In such a process, passengers purchase tokens that may be used as a transportation fare. Such may be analogous to creating a credit or a "stored value." In public transportation where operating costs exceed fare revenue, the "stored value" does not exist in a monetary account waiting for the passenger to travel. Second, there is a process identified as check token. In such a system, the system checks tokens for each passenger to ensure that the passenger has what is required for each transportation fare. The fare is checked before each passenger boards a vehicle in secure gate scenarios and after the passenger boards vehicles in open gate scenarios. Such may be analogous to "authorizing" that the customer has appropriate "stored value."

Continuing with the public transportation example and in accordance with aspects of the present invention, when passengers purchase tokens that may be used as transportation far; two different things may happen. The physical money presented, or money transferred from a payment item such as a debit card, credit card, etc., may be credited into a monetary account owned by the company or organization providing the product or service that the consumer will purchase. This monetary account may be at a financial entity, such as a bank. The physical money presented, or money transferred from a payment item, such as a debit card, credit card, etc., may be represented virtually in a non-monetary account that is analogous to a deposit account or a sub-account thereof. This non-monetary account may be associated with the consumer and may be used for accounting purposes to keep a record of deposits and withdrawals.

The second process identified as check token, may become an "authorization" against the virtual value in the non-monetary account or sub-account thereof. Such may be analogous to a debit card authorization for a transaction from a deposit account. The "deposit" account accessed for the authorization is a non-monetary account used for accounting purposes only. The process checks to see if the consumer has used all of the funds previously deposited into the monetary account. If sufficient virtual funds exist, the authorization may be approved and the virtual value may be decreased by the transaction amount.

The process, identified as payment, by consumers may be deposited into a monetary account owned by a product and/or service provider and credit may be created in a non-monetary account associated with the consumer. This process may separate monetary deposits into two pieces, a traditional monetary account designated by the product and/or service provider, and a virtual credit in a non-monetary account at a financial entity associated with the consumer. When the consumer attempts to purchase a product and/or service, the process is a traditional debit card authorization against the non-monetary account that contains virtual credit. Since the authorization is applied to a non-monetary account used only for accounting purposes, this account can be anonymous. This process may be applied to public transportation systems and any other scenario where consumers "pre-pay" for products and/or services that will be received at a later time.

An illustrative example of aspects of an anonymous account system in accordance with the present disclosure is described. A company may exist that sells a product X in its stores all throughout the United States. The company may own a monetary account at a financial entity. A customer may use a debit card or other payment item to transfer monetary assets to the monetary account owned by the company at the financial entity. The transfer may be a credit of funds for use at stores of the company. The transferred monetary assets may be represented virtually in a non-monetary account associated with the customer. This may be used for accounting purposes and maintained by the financial entity or the company. If the customer decides to purchase a product X from a store of the company, she may desire to utilize the transferred monetary funds. In one scenario, the customer may simply utilize her biometric information with an iris scan to purchase the product X. Such a transaction acts as an authorization against the virtual monetary assets in the non-monetary account that the customer has with the company. This authorization ensures that the customer has not used all of the monetary assets previously deposited into the monetary account. If sufficient virtual funds exist, the authorization is approved and the virtually represented value in the non-monetary account is decreased by the transaction amount to purchase product X.

In still other scenarios, biometric identification for purchase transactions may be utilized. For example, a user may register with an entity in a similar manner as described before. Such an example may be a national company of coffee shops where a user has provided similar information of financial data, such as a checking account number, and biometric data, such as a scan of her iris. Thereafter, if a user enters a coffee shop of the national company, a user may just need to order and have her iris scanned to complete the transaction.

In still another example, the user may not even need to order. As part of the registration process or sometime thereafter, a user may specify that they always want a coffee when going to that national company. Thereafter, when entering the coffee shop and having her iris scanned, the user may pick up her coffee and go. The user need not provide a name, an order, or any other type of identification. Still further, as part of the registration process or sometime thereafter, a user may specify different orders for different times, events, situations. For example, the system may allow a user to specify that she wants coffee if in the morning, cappuccino if in the afternoon, and hot chocolate if at night. Alternatively, the user may specify that she wants hot coffee on days when it is below 60 degrees and iced coffee on days when it is 60 degrees or higher. Any number of different operations may be utilized in accordance with one or more aspects of the present disclosure.

In accordance with other aspects of the present disclosure, a user may register in a similar manner as described herein. Upon entering a restaurant where the user may have a registration, a camera may passively capture the iris of the user. Thereafter, a maitre de, host, and/or server may be prompted to the arrival of the individual and thereafter may be greeted personally and led to a table. Any of a number of different uses may be utilized in accordance with the aspects described herein.

In accordance with another illustrative example, a user may register with a clothing store in a similar manner as described herein. Upon purchasing products from the clothing store, the iris of the user may be scanned. The user may be prompted to select an account for withdrawal of the funds from for payment on the transaction or may be prompted to select a different account a default account. In such an example, the user may select "2" on a keypad with a display that corresponds to a checking account of the user. Upon receipt of the selection, the system may confirm that the account has sufficient funds to complete the transaction. If not, the system may prompt the user to choose a different account for withdrawal of the funds for the transaction.

Figure 6:
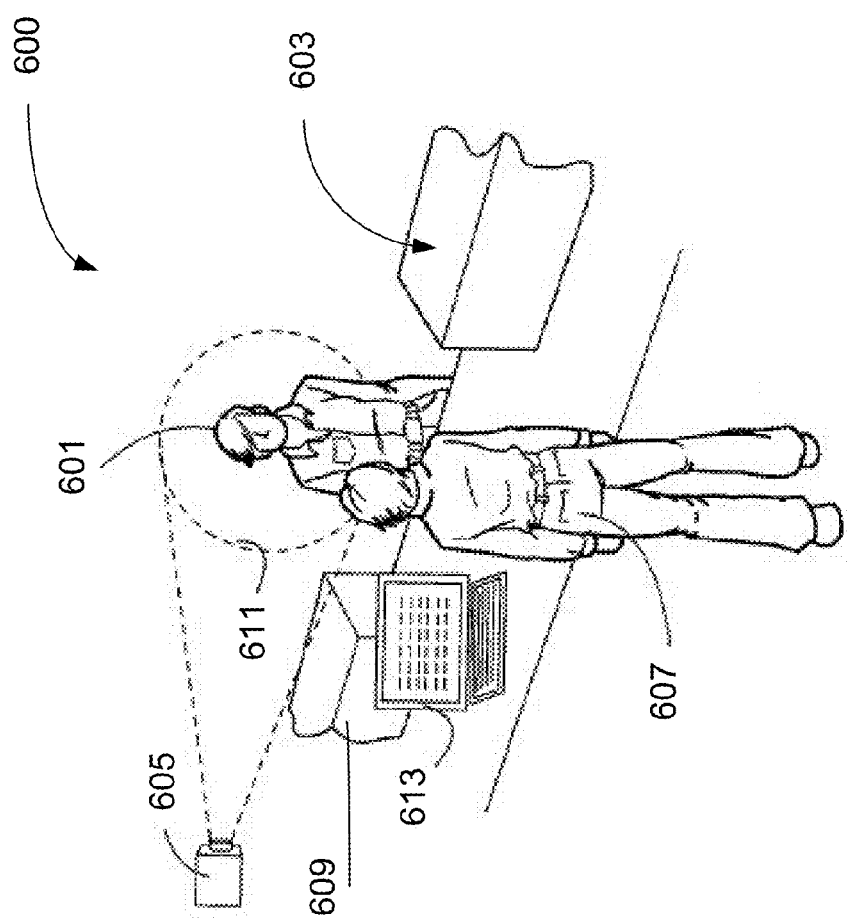
FIG. 6 is an example block diagram of an illustrative environment for identifying an individual for transaction processing in accordance with at least one aspect of the present disclosure.

FIG. 6 is an example block diagram of an illustrative environment 600 for identifying an individual for transaction processing in accordance with at least one aspect of the present disclosure. FIG. 6 illustrates an in-person transaction to purchase a product 603 at a checkout station, which occurs between an individual purchaser 601 and an employee 607 of a store. A camera 605 is shown having an optical field of view 611 that encompasses the area in front of the employee 607 and is capable of capturing an image of the iris of the individual purchaser 601. Camera 605 may be any of a number of different image capturing devices with a focal length capable of capturing clear images of the iris of an individual purchaser within its field of view.

With the captured iris information, a computer, local to or remote from, the camera 605 may receive the captured iris data for processing and identification of the individual purchaser 601. Any of a number of different program applications may be utilized with respect to hardware, firmware, and/or software for matching a captured iris image with stored iris images. Once a match is found, the employee 607 may be prompted by a computer output 613 that the transaction has been processed and the individual purchaser 601 may leave with the product 603.

In an alternative example, the individual purchaser 601 may be prompted by a computer output/input device 609 to select from a number of funding accounts that funds for the transaction payment amount may be transferred from. Individual purchaser 601 may enter in a selection and the transaction may then be completed. If the selected funding account is deficient in funds to complete the transaction, the employee 607 through output device 613 and/or the individual purchaser 601 through output/input device 609 may be prompted to have the individual select a different account.

Figure 7:
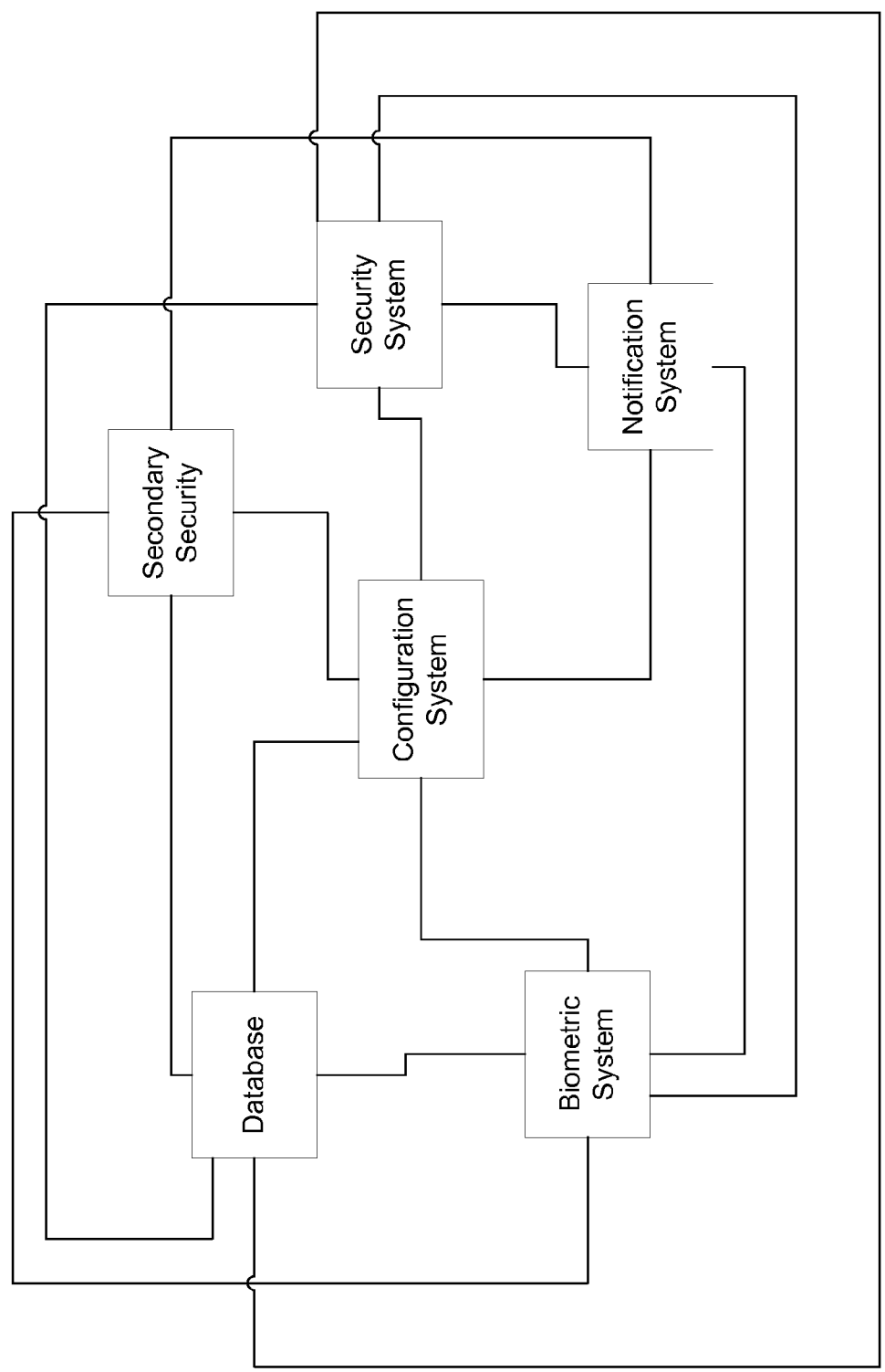
FIG. 7 is an illustrative schematic diagram of a security system for biometric identification and authentication in accordance with one or more aspects of the present disclosure.

Further aspects of the present disclosure describe authentication systems for security and vaults that are configured to authorize only specific individuals entry into a vault or area. A system in accordance with the present disclosure is shown in FIG. 7 of a security authentication system configured to authorize specific people into an area, such as a vault associated with a financial entity.

As shown, a security authentication system may include multiple components that may be included within the same device or configured across multiple devices. A configuration system may be included to allow for configuration of any one or multiple components. A database may be accessible by any one of the components. A biometric system may be included to allow for scanning of an iris of an individual and/or other types of biometric identification and authentication, including fingerprint analysis. Multiple security systems, such as primary and secondary systems shown, may be included. The primary security system may be configured to be a first point of security in identifying and/or authenticating a person.

With respect to the example of a bank vault, the primary security may be an iris scanning result coupled with a video feed. The primary security system may be configured to detect more than one individual at the door of the vault in order to restrict entry, even if an individual with the proper and allowed iris match is one of the people at the door. As such, if the proper individual is being forced to scan her iris for entry, such as in a hostage situation, the primary and/or the secondary security system may be configured to prevent access even if the biometric system determines the individual to be allowed to access the vault. Under such a situation, a notification system may be configured to notify someone or something as to the current situation for an appropriate response to occur.

In still other scenarios, the system may be configured to detect that a person is attempting to access the vault and is carrying something that restricts her ability to open doors, such as the individual carrying a large stack of papers. The system may be configured to identify and authenticate the individual, and if a proper match occurs to an authorized individual in the database, the vault door may be configured to open directly for the individual so she need not put down her papers to open them. In still another scenario, the same might occur as an individual is leaving the vault. In such a case, as the individual approaches the door, the vault door may open for her to exit. Under one scenario, the system may first determine that no one else is outside of the vault that might attempt to gain unauthorized access.

In still further examples, primary or secondary security systems may be configured to ensure that individuals authorized to access the vault are not performing some unauthorized activity in conjunction. For example, if an individual with proper access to the vault attempts to remove unauthorized material from the vault, one or both of the security systems may be configured to respond. The secondary security system may include a system for weighing an individual upon entry and exit from the vault. Such a system would ensure that a person entering the vault is of the same weight in exiting the vault. In addition, the person may be periodically reweighed while within the vault or other restricted area to ensure that the person has not taken something from the vault without authorization or has not placed something within the vault without authorization. If the person's weight does not change beyond an allowable threshold, then a notification to security personnel or others would not be necessary. However, if the individual's weight exceeded or fell below the allowable threshold, to indicate taking something or leaving something, then a notification may be sent to security personnel or others. Concurrently and/or alternatively, one of the security systems may be configured to track the individual's movement within the vault to ensure that the individual remains in areas or portions that she is authorized to access. Other secondary systems may be implemented herewith including additional logging systems for additions made to the vault or items removed from the vault. Similar aspects may be utilized with respect to safe deposit boxes as well.

Other aspects of the present disclosure are directed to building security authentication and tracking systems to allow authorized individuals into certain buildings or areas and preventing unauthorized individuals from entering and/or accessing certain buildings or areas. A similar configuration of components may be utilized for such as system as shown in FIG. 7. In such a scenario, additional components may be included in accordance with additional aspects. For example, upon identification and authentication of an individual, the system may track movement of the individual throughout a building. Upon entering an elevator, the system may be configured to default automatically the floor option for the individual. Such a situation might be a building in which multiple companies on multiple floors exist. Alternatively, one company with different departments on different floors of a building may also apply.

Based upon a historical determination from the database of what floor the individual usually exits the elevator, the system may default the choice of floor for that individual. Such a system is extremely useful for an individual with disabilities. Such an individual on crutches need not have to push a button to choose a floor option. Even if the individual wants to go to a different floor, other systems may be configured then to allow the individual to override the floor choice either verbally or in some other manner.

Such a configuration may be utilized with a tracking system. Such a tracking system may be a secondary security system. The tracking system may be configured to approximate the location of an individual throughout her time within a building or area. The tracking system may be a number of cameras or detectors and may include a video feed and/or additional biometric scanning systems. Such a system ensures that an individual authorized to be in the building is restricted to only those areas within the building that she is authorized to access. As such, an individual authorized to exit an elevator on the fifth floor since that is her place of employment may be restricted from exiting the sixth floor of the building. Still further, areas within a floor may similarly be restricted by such features to ensure that an individual remains within authorized areas of a particular floor. Such features and system may be integrated with additional card-based, voice-based, and/or other security systems.

Aspects describe systems to prevent maintaining a doorway open into the area or vault in addition to unauthorized entry or exit of people or things into or out of such areas or vaults. Should an authorized individual attempt to bypass the closing of a door to a room and/or vault, the system may be configured to take responsive action. For example, the system may be set up to have two doors. A second door may be configured to remain closed until the first door has shut. As such, an authorized individual may enter a first door and wait for it to close before a second door opens to allow her access to the room and/or vault.

Aspects describe tracking of individuals throughout a building or facility to ensure authorized access in addition to identification of individuals in the event of an emergency and/or disaster situation. With implementation of a tracking system based upon biometric and/or other security systems, a real time monitoring of individuals within a building or area may occur. With such real time monitoring, the system may know exactly who is in a building and where they are located. Such may be extremely helpful in the event of an emergency.

Should a natural disaster, man-made incident, or other incident occur within or around a building or area being monitored, a notification system may forward identification of known individuals in the area for disaster recovery teams, security personnel, members of the police or fire department, and/or other individuals. Such information as to number of individuals, locations of individuals, etc. may be helpful in assisting teams or other individuals to respond in certain areas first. If known that no one was on the second, third, or fifth floors of a building, in the event of an earthquake, disaster recovery teams need not access those areas until other areas where people were known to have been.

Still another aspect is directed to a child or elder care facility identification system. A biometric system may identify a child and/or elder individual upon entry into such a facility. For example, when a child is dropped off at a day-care facility, an iris scanning system may be utilized to scan the child's iris for identification and authentication of the child and the individual dropping the child off. Based upon previous authorized people to pick-up the child from the facility, the system may be configured to scan the iris of the individual picking up the child to ensure that she is authorized to do so. For example, a guardian, such as a parent of the child, may allow either parent, an aunt, and a particular caretaker, such as an authorized babysitter, to pick up her child from the facility. In such a case, when an individual attempts to retrieve a child from the facility, the iris scanning system may be configured to ensure that she is authorized to take the child. Should an unauthorized individual attempt to remove a child, a notification system may be configured to alert someone or something as to the situation.

Another aspect of the present disclosure is directed to methods and systems for customer authentication and identification during transactional situations. Aspects describe systems and methods for identifying a customer upon entry into an establishment and one or more various responses in return. In accordance with one embodiment, upon identification and authentication of a customer, an individual of a store or business may be notified to an arrival. If a meeting is already scheduled, that individual can immediately interact with the customer. Alternatively, if the meeting is not scheduled, but the individual is identified as an important customer or one that should be addressed immediately, an individual may be notified to address the needs of that customer. With identification and authentication, the individual of the business to interact with the customer may be notified of the customer's name and/or other information in order to address the person by specific name as opposed to a simple greeting of "how may I help you?."

Such a system may be utilized for a financial entity. In such a situation, as a customer enters the banking center, an iris scanning system may be configured to capture the iris of the individual. The system identifies and authenticates the individual. In response, a banking center greeter may be notified by a notification system that a particular individual, such as Customer #1, a loyal customer for over 5 years, has entered the facility. The greeter may then have instructions under various scenarios for responding to the entry of Customer #1. For example, the greeter may approach Customer #1 and inquire as to his business needs today. Alternatively, if an apportionment has been arranged, the greeter, or the individual to which Customer #1 has an appointment, may directly address Customer #1 regarding his needs. A database may be utilized in conjunction with the biometric system and/or security systems to gain further information regarding the needs of Customer #1. For example, if Customer #1 has an appointment with a particular individual with the banking center, upon identification and authentication of the individual as Customer #1, the system may notify the particular individual to which Customer #1 has an appointment and/or may have someone bring necessary forms or paperwork for Customer #1 to fill out. In an alternative system, such forms may be sent to Customer #1 electronically upon entry into the facility, such as through his cellular telephone.

In accordance with still other aspects, customer's interests within the store may be tracked in order to provide additional information. Such information may be provided by means of a display and/or individual. For example, interactive displays may be customized specific to a customer or group of customer as she is or they are waiting in line for access to a teller. If a customer enters a banking center and spends a threshold amount of time looking at one area, such as signs or displays regarding current home equity loan rates, one or more ads or other information may be displayed for the customer. For example, additional details on the length of the term, the current prime interest rate, the approximately amount of time for closing, etc. may be provided while the user waits. Different options may also be provided for a customer to consider, such as alternatives to home equity loans. Any of a number of different advertisements and/or other information may be provided to a customer.

In an alternative example, an automated greeter may address the customer to inquire about needs and then present information on the subject, notify an individual to address the needs of the customer, and/or take some other action such as to print out forms for the customer to fill out. Such an automated greeter may be a station separately located within the facility and/or may be a number of kiosks or other areas for accessing information. For example, with respect to an airport, an individual need only walk up to the electronic ticketing area to confirm a boarding pass and seat. A paper copy of the boarding pass may not be needed as the identified and authenticated individual can pass through security and get right onto a plane flight by continuous monitoring of her location and tracking of her movement within the airport.

When used with respect to an external device, such as an automated teller machine (ATM) of a financial entity, iris scanning and/or other biometric data may be utilized to identify and authenticate a user. As such, under such systems, an individual that attempts to fraud the ATM may be prevented. Even with a valid debit card and password for the debit card, the system may require an iris scan, thus preventing an individual with a stolen or otherwise illegal card from withdrawing funds from an account. Still other features associated with ATM withdrawals and/or deposits may be utilized.

In a similar manner, online banking and/or other online transactions may utilize iris scanning and/or other biometric identification and authentication. For example, if an individual seeks to get a prescription mailed directly to them, an iris scan of the individual may be taken and matched against allowed drugs or other things that the individual may have sent to her home. As such, an authorized individual need not go to a store to pick up the drugs but may have allowable drugs and/or other items sent directly to her.

Based upon historical data on a customer, action may be taken regarding a change of behavior of the customer. For example, if a customer has called a service line of an entity to look into changing service or even canceling service, the next time she enters a store of the entity, she may be notified to available options or features for her to attempt to maintain her business. In addition, if historical data on the customer shows particular interest in certain products or services, upon entering a store, ads and/or other information may be provided to the customer that is similar. For example, if a customer has been searching a website of the entity for baby sheets and blankets, information on baby sheets and blankets and/or other baby products may be provided to the customer if she enters a store of the entity. Thus, changes of the behavior of the customer and/or interests of the customer may be addressed prior to the customer canceling all services or business with the entity.

In addition to displays, a cellular telephone or other device of a customer may be contacted in order to provide ads and/or other information. For example, upon determining that a customer in line has been reviewing a chart on current mortgage rates for a threshold period of time, a text message and/or other data may be sent to the cellular telephone of the individual with other information on mortgage rates. As such, a user such as a teller, information may already be provided to the teller regarding the needs of the customer for her transaction. For example, background credit checks and other information may already be processed to start an application process on a new mortgage with the entity.

Still other aspects are directed to use of the present disclosure with secondary authentication systems. For example, if a purchase exceeds a threshold amount, such as $25, additional authentication of the individual may be required, such as a license and/or other identification. For any transactions of $25 or less, identification and authentication by iris scanning once may be enough to allow the transaction to be completed. Any of a number of different variables for secondary authentication may be utilized in conjunction with the present disclosure.

Other uses within a retail transactional environment may be utilized. For example, upon entry to a store, further aspects of the present disclosure allow for identification of known past fraudulent offenders or other individuals wanted by the police. Immediate action may be taken to remove other customers from the premises and/or subdue the individual. As such, if an individual has attempted to cash a fraudulent check in the past, a teller and/or other individual, such as security and/or the police, may be notified to either prevent cashing of the check and/or to hold the individual for questioning. A database of known offenders may be accessed upon entry of the individual in the center. If identified, a teller may be informed not to allow the transaction to cash the check to be completed. Other security measures to record the transaction and/or notify other individuals may be implemented. If a first time occurrence by an individual, data on the identified individual, such as video and/or biometric data captured, such as the scanned iris of the individual, may be maintained and/or forwarded to other individuals including security personnel, the police department, and/or others.

Other aspects allow for identification and authentication of individuals at a drive-up window of a business. Such as system may be configured to scan the iris of an individual either directly, e.g., by requesting the individual look at a particular area, such as a camera, or indirectly, e.g., by capturing an image of the iris as the individual is looking around. As such, while waiting until her turn to access the drive-up window, the system can process the credentials and other information of the individual to identify and authenticate the drive. Therefore, when the driver approaches the window, a teller may respond by directly addressing the person by name. Such a service-oriented approach to customers may assist retention of the customer for future business. For a bank entity, the processing of identification and authentication on one or more accounts can be handled as the individual drives up to the business and not after the individual gets to the window. For a prescription pick-up window, once identified and authenticated, the prescription can be picked up directly without waiting in a line.

Other situations may be utilized in conjunction. For example, as an individual drives up to a gas station pump, her iris may be scanned near to or upon leaving the vehicle. Processing of the identification and authentication of the individual may occur so that the person need only lift the pump and engage with the gas tank to start the process. The individual need not wait while a credit card is read and authorized. Defaults may be set up where the system identifies the car type, whether from previous information supplied by the individual and/or by identifying the vehicle directly by the system. Under such a scenario, the type of fuel, such as highest octane may be chosen by the system for pumping into the vehicle. Additional security measures may be used in conjunction with such a system and/or override conditions may be utilized to allow the individual to change the fuel grade to be inputted into the vehicle.

Such an identification and authentication system may be utilized to prevent gas station fraud as well. For example, if a known individual is identified by such a biometric system that has committed fraud on the gas station in the past, such as pumping gas and not paying for it, the system may lock the pump down from dispensing gas. Other responses may occur such as to notify an attendant or to notify the police or other security. For first time offenders where the system does not know of past incidents, a record of the scanned iris may be maintained and/or sent to law enforcement or other individuals for action to be taken as necessary under the circumstances. A secondary security system may be set to have a camera also take a license plate picture or other data to identify the vehicle used in the fraud.

Still other aspects allow for action in response to authentication of armed car guards, night deposit workers, cash recycling individuals, and other individuals. One or more aspects described herein may be utilized to ensure that properly identified, authenticated, and authorized individuals are gaining access to certain areas and/or things. As such, iris scanning may be utilized to ensure that someone dressed as an armored car guard and having credentials of an armored car guard is actually one that is authorized to obtain monetary and/or financially related documents/instruments on behalf of a financial entity.

Identification and authentication of an individual may occur remotely for use with a web site as well. For example, an employee of an entity may utilize a webcam on a laptop remote from a database facility to gain access to records within the facility. As opposed to a userid and password that may be used by anyone, a biometric scanning feature may be utilized to ensure that the individual is an authorized employee.

One or more databases may be utilized herein and various aspects may be used for different indented purposes in accordance with aspects of the present disclosure. For example, one database for access may include particular legal documents associated with a contract, transaction, litigation, or other legal matter. Utilizing biometric identification and authentication, authorized individuals may be allowed access to documents contained therein from remote locations. Such a system may allow for litigations in which documents must be provided in discovery to be maintained by all parties in one database and only authorized individuals are then allowed to access. Similar databases may be utilized in conjunction with an iris scanning and/or other biometric identification and authentication system. One such example is a database of financial records. Such a database may allow for individuals to configure accounts to be accessed by any of a number of different people, such as spouses, children, parents, other family members, financial advisors, accountants, and/or other individuals.

Utilizing one or more aspects of the present disclosure, areas that generally require an individual to have cash on hand may now be configured as a cashless environment. For example, at sporting or other events, concessions, paraphernalia, and/or other items may now be purchased on hand without need for anything more than a particular biometric of an individual. Utilizing an iris scanner, an individual can have an account accessed for withdrawal of funds to purchase food, a jersey, and/or other items while attending the game. In addition, even if the individual has forgotten a ticket, such a system may be utilized to allow access to the event without a ticket if previously noted as having purchased one for the event. A database may be maintained to ensure that two people under the same seat number do not enter the event and/or may be tracked once within the event to ensure fraud on the event is not occurring and/or is addressed.

Other environments that may utilize such a system include an airport. Security may be sped up by performing an iris scan on all individuals seeking to gain entry onto a flight. Secondary measures may additionally be included, such as a license or passport check. However, use of the iris scanning may be used to ensure that false documents are not being utilized by the individual. Still further, aspects of the cashless environment may still be utilized within the airport once the individual is identified and authorized. As such, prior to a flight, the individual may purchase a soda and a magazine without need for cash or a credit card.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A computer-implemented method comprising:
    determining, by a computing device, whether a first individual has entered a field of view of a biometric scanning device associated with a vault;
    receiving, at the computing device, first data representative of a scanned iris of the first individual associated with the biometric scanning device;
    receiving, at the computing device, second data representative of a scanned iris of a second individual associated with the biometric scanning device;
    identifying, by the computing device, the first individual based upon the scanned iris of the first individual; permitting entry of the identified first individual into the vault; and determining a weight associated with the first indiviual;
    identifying, by the computing device, the second individual based upon the scanned iris of the second individual;
    permitting, by the computing device, entry of the identified second individual into the vault and determining a weight associated with the second individual;
    biometrically monitoring, by the computing device, movement of the first individual or the second individual within the vault;
    determining, by the computing device, whether the one of the first individual and the second individual is attempting to leave an object in the vault based on at least determining whether the calculated weight of one the first individual and the second individual has fallen below an allowable threshold value upon exit of the vault and the scanned iris of one of the first individual and the second individual respectively; and
    responsive to determining whether the calculated weight of one the first individual and the second individual has fallen below an allowable threshold value initiating, by the computing device, an electronic notification of the attempt to leave an unauthorized object in the vault.

2. The method of claim 1, further comprising maintaining, at the computing device, a logging system for one or more objects left in the vault.

3. The method of claim 1, further comprising receiving, at the computing device, data representative of individuals authorized to leave one or more objects in the vault.

4. The method of claim 1, further comprising maintaining, at the computing device, a logging system to record entry of the identified first individual or the second individual to the vault based on data representative of the scanned iris, respectively.

5. The method of claim 1, further comprising receiving, at the computing device, data representative of one or more object removed from the vault by way of a logging system.

6. The method of claim 1, further comprising receiving, at the computing device, data representative of one or more objects left in the vault.

7. A computer system comprising:
    one or more processors; and
    memory storing computer readable instructions that, when executed, cause the one or more processors to perform:
        determining, by the one or more processors, whether a first individual has entered a field of view of a biometric scanning device associated with a vault;
        receiving, at the one or more processors, first data representative of a scanned iris of the first individual;
        receiving, at the one or more processors, second data representative of a scanned iris of a second individual;
        identifying, by the one or more processors, the first individual based upon the scanned iris of the first individual; permitting entry of the identified first individual into the vault; and determining a weight associated with the first individual;
        identifying, by the one or more processors, the second individual based upon the scanned iris of the second individual;
        permitting entry of the identified second individual into the vault and determining a weight associated with the second individual;
        biometrically monitoring, by the one or more processors, movement of the first individual or the second individual within the restricted vault;
        determining, by the one or more processors, whether the first individual is attempting to leave an object in the vault based on at least determining whether the calculated weight of one the first individual and the second individual has falling below an allowable threshold value upon exit of the vault and the scanned iris of one of the first individual and the second individual, respectively; and
        responsive to determining whether the calculated weight of one the first individual and the second individual has falling below an allowable threshold value, initiating, by the one or more processors, an electronic notification of the attempt to leave an unauthorized object in the vault.

8. The system of claim 7, wherein the memory storing computer readable instruction that, when executed, further cause the one or more processors to perform maintaining a logging system for one or more objets left in the vault.

9. The system of claim 7, wherein the memory storing computer readable instructions that, when executed, further cause the one or more processors to perform receiving, at the computing device, data representative of individuals authorized to leave one or more objects in the vault.

10. The system of claim 7, wherein the memory storing computer readable instructions that, when executed, further cause the one or more processors to perform maintaining, at the computing device, a logging system to record entry of the identified first individual or the second individual to the vault.

* * * * *